(12) United States Patent
Woike

(10) Patent No.: US 11,646,031 B2
(45) Date of Patent: May 9, 2023

(54) METHOD, DEVICE AND COMPUTER-READABLE STORAGE MEDIUM HAVING INSTRUCTIONS FOR PROCESSING A SPEECH INPUT, TRANSPORTATION VEHICLE, AND USER TERMINAL WITH SPEECH PROCESSING

(71) Applicant: VOLKSWAGEN AKTIENGESELLSCHAFT, Wolfsburg (DE)

(72) Inventor: Rüdiger Woike, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/956,913

(22) PCT Filed: Nov. 26, 2018

(86) PCT No.: PCT/EP2018/082543
§ 371 (c)(1),
(2) Date: Jun. 22, 2020

(87) PCT Pub. No.: WO2019/134774
PCT Pub. Date: Jul. 11, 2019

(65) Prior Publication Data
US 2020/0342876 A1 Oct. 29, 2020

(30) Foreign Application Priority Data
Jan. 4, 2018 (DE) .................... 10 2018 200 088.3

(51) Int. Cl.
*G10L 15/26* (2006.01)
*G06F 40/30* (2020.01)
(Continued)

(52) U.S. Cl.
CPC ............. *G10L 15/26* (2013.01); *G06F 40/30* (2020.01); *G10L 13/04* (2013.01); *G10L 15/18* (2013.01);
(Continued)

(58) Field of Classification Search
CPC ......... G10L 25/10; G10L 13/04; G10L 15/18; G10L 15/28; G10L 2015/223
(Continued)

(56) References Cited

U.S. PATENT DOCUMENTS 7,533,023 B2 * 5/2009 Veprek .................... G10L 15/30
704/270.1
9,159,322 B2 10/2015 Burke et al.
(Continued)

FOREIGN PATENT DOCUMENTS

DE 102012218938 A1 4/2013
DE 102014201676 A1 10/2014
(Continued)

OTHER PUBLICATIONS

P. Mac Aonghusa and D. J. Leith, "Plausible Deniability in Web Search—From Detection to Assessment," in IEEE Transactions on Information Forensics and Security, vol. 13, No. 4, pp. 874-887, Apr. 2018, doi: 10.1109/TIFS.2017.2769025. (Year: 2018).*
(Continued)

*Primary Examiner* — Bharatkumar S Shah
(74) *Attorney, Agent, or Firm* — Barnes & Thornburg, LLP

(57) ABSTRACT

A method, a device, and a computer-readable storage medium having instructions for processing a speech input. A speech input from a user is received and preprocessed for at least one of two or more available speech-processing services. The preprocessed speech inputs are transferred to one or more of the available speech-processing services.

25 Claims, 6 Drawing Sheets

(51) Int. Cl.
*G10L 13/04* (2013.01)
*G10L 15/18* (2013.01)
*G10L 15/28* (2013.01)
*G10L 15/22* (2006.01)

(52) U.S. Cl.
CPC ........ *G10L 15/28* (2013.01); *G10L 2015/223* (2013.01)

(58) Field of Classification Search
USPC .......................................................... 704/231
See application file for complete search history.

(56) References Cited

U.S. PATENT DOCUMENTS

| | | | |
|---|---|---|---|
| 9,202,459 | B2 | 12/2015 | Tzirkel-Hancock et al. |
| 9,412,374 | B2 | 8/2016 | Gruchalski et al. |
| 10,176,806 | B2 | 1/2019 | Engelhardt |
| 10,482,904 | B1 * | 11/2019 | Hardie .................... G10L 15/22 |
| 2012/0245945 | A1 * | 9/2012 | Miyauchi ................ G10L 15/06 704/E11.001 |
| 2013/0102295 | A1 | 4/2013 | Burke et al. |
| 2013/0197915 | A1 * | 8/2013 | Burke .................... G10L 21/06 704/275 |
| 2014/0357248 | A1 | 12/2014 | Tonshal |
| 2015/0058018 | A1 | 2/2015 | Georges et al. |
| 2017/0371620 | A1 * | 12/2017 | Zhou ...................... H04L 51/18 |

FOREIGN PATENT DOCUMENTS

| | | |
|---|---|---|
| DE | 102014209992 A1 | 12/2014 |
| DE | 102014109121 A1 | 1/2015 |
| DE | 102014210716 A1 | 12/2015 |
| DE | 102014017384 A1 | 5/2016 |
| DE | 102015213722 A1 | 1/2017 |
| EP | 2909833 A1 | 8/2015 |
| KR | 200432373 B1 * | 5/2004 ............. G10L 15/22 |

OTHER PUBLICATIONS

P. D. Jaramillo, F. H. Wu, C. D. Knittle and R. W. Beach, "Implementation and performance issues from a voice activated network control trial," Proceedings of IVTTA '96. Workshop on Interactive Voice Technology for Telecommunications Applications, 1996, pp. 125-128, doi: 10.1109/IVTTA.1996.552790. (Year: 1996).*

P, Mac Aonghusa and D. J. Leith, "Plausible Deniability in Web Search—From Detection to Assessment," in IEEE Transactions on Information Forensics and Security, vol. 13, No. 4, pp. 874-887, Apr. 2018, doi: 10.1109/TIFS.2017.2769025. (Year: 2018) (Year: 2018).*

P. D. Jaramillo, F. H. Wu, C. D. Knittle and R. W. Beach, "Implementation and performance issues from a voice activated network control trial," Proceedings of IVTTA '96. Workshop on Interactive Voice Technology for Telecommunications Applications, 1996, pp. 125-128, doi: 10.1109/IVTTA.1996.552790. (Year: 1966).*

P, Mac Aonghusa and D. J. Leith, "Plausible Deniability in Web Search—From Detection to Assessment," in IEEE Transactions on Information Forensics and Security, vol. 13, No. 4, pp. 874-887, Apr. 2018, doi: 10.1109/TIFS.2017.2769025. (Year: 2018) (Year: 2018).*

Reverb for Amazon Alexa; downloaded from https://play.google.com/store/apps/details?id=agency.rain.android.alexa&hl=en_US; disclosed prior to Jan. 4, 2018.

Wikipedia; Amazon Echo; downloaded from https://en.wikipedia.org/wiki/Amazon_Echo; disclosed prior to Jan. 4, 2018.

Wikipedia; Cortana; downloaded from https://en.wikipedia.org/wiki/Cortana; disclosed prior to Jan. 4, 2018.

Wikipedia; Google Allo; downloaded from https://en.wikipedia.org/wiki/Google_Allo; disclosed prior to Jan. 4, 2018.

Wikipedia; Siri; downloaded from https://en.wikipedia.org/wiki/Siri; disclosed prior to Jan. 4, 2018.

Search Report for International Patent Application No. PCT/EP2018/082543; dated Feb. 22, 2019.

Office Action; Chinese Patent Application No. 201880085230.9; dated Jan. 12, 2023.

* cited by examiner

METHOD, DEVICE AND COMPUTER-READABLE STORAGE MEDIUM HAVING INSTRUCTIONS FOR PROCESSING A SPEECH INPUT, TRANSPORTATION VEHICLE, AND USER TERMINAL WITH SPEECH PROCESSING

PRIORITY CLAIM

This patent application is a U.S. National Phase of International Patent Application No. PCT/EP2018/082543, filed 26 Nov. 2018, which claims priority to German Patent Application No. 10 2018 200 088.3, filed 4 Jan. 2018, the disclosures of which are incorporated herein by reference in their entireties.

SUMMARY

Illustrative embodiments relate to a method, a device, and a computer-readable storage medium comprising instructions for processing a voice input. Illustrative embodiments furthermore relate to a transportation vehicle and a user terminal device with speech processing, in which a disclosed method or a disclosed device is used.

BRIEF DESCRIPTION OF THE DRAWINGS

Disclosed embodiments will become apparent from the following description and the appended claims, in connection with the figures.

DETAILED DESCRIPTION

Figure 1:
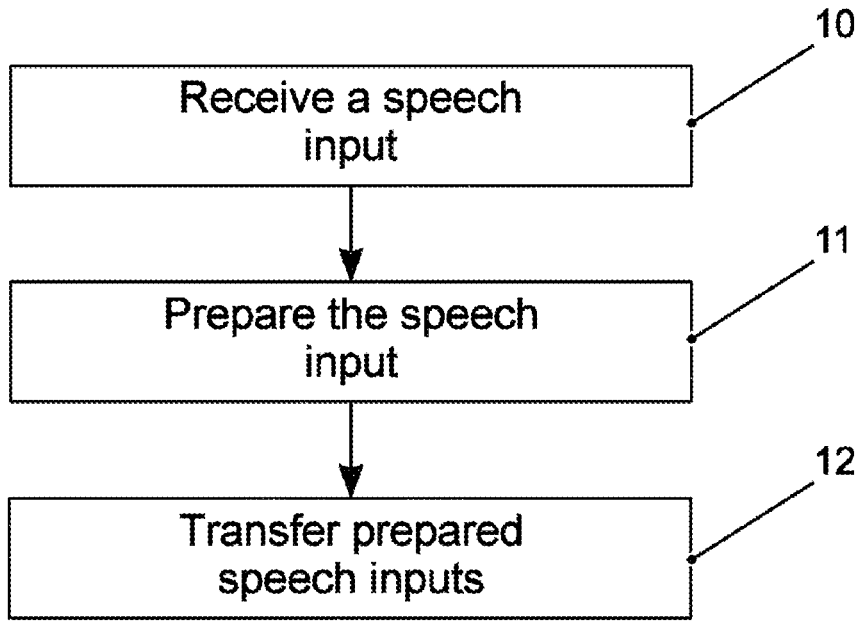
FIG. 1 schematically depicts a method for processing a voice input.

Using a speech processing system, users can conduct partially or fully automated dialogues in largely natural speech, via a speech interface. Such speech processing systems are, for example, known from the field of telephone services. In such applications, all of the speech processing takes place via a computer system on the side of the service provider.

A further application field of speech processing systems includes "smart home" devices, i.e., devices for an intelligent home. The general term "smart home" includes technical methods and systems which aim to increase the quality of living conditions and the quality of life, to increase safety, and to increase energy efficiency. The basis therefor is formed by networked and remotely controllable devices and automatable processes. Such devices sometimes allow speech-based interaction with an intelligent personal assistant. Since qualitatively high-quality speech processing requires a great deal of computing power, the speech processing in such devices takes place primarily via computer systems on the side of the provider of the intelligent personal assistant. Limited speech recognition is carried out via a user-side device for merely activating the speech processing.

In addition, device-integrated speech processing systems are increasingly used, for example, in navigation systems in transportation vehicles which can be controlled by voice input, or in hands-free devices in transportation vehicles, via which the functions of the transportation vehicle can be controlled. These systems usually operate locally.

Against this background, DE 10 2014 017 384 A1 describes a method for operating a transportation vehicle operating device for ascertaining at least one recognition result for a voice input of the user by a speech recognition system, and for outputting the recognition result as a list of results. If the user makes a second voice input afterwards, it is checked whether the user is repeating or correcting the content of the first voice input because the driver did not find the desired recognition result in the result list.

DE 10 2014 201 676 A1 describes a method for controlling a speech dialogue of a speech system. First, a first statement by a user of the speech system is received. Based on this first statement, a first list of possible results is then determined. The elements of the first list are then analyzed to determine ambiguity of the elements. Finally, a voice request generated to prompt the user to resolve the ambiguity, based on a partially orthography and the ambiguity.

Increasing the reliability of the speech processing is desirable especially for use in the transportation vehicle. The driver should not be distracted from driving by having to pay partial attention to the interaction with the speech processing because voice inputs were not understood.

A first approach for increasing the reliability of the speech processing is based on taking contextual information into consideration.

For example, DE 10 2015 213 722 A1 describes a method for operating a speech recognition system in a transportation vehicle. When recording a voice input of a user, data about the context of the voice input are additionally gathered. Subsequently, a recognized text of the voice input is first generated, and a semantic analysis of the recognized text is carried out. As a function of the semantic analysis and the data for the context of the voice input, a recognition quality of the recognized text is determined, and a speech model is selected from a plurality of speech models. This speech model is used for further text recognition and further semantic analysis. This approach is repeated iteratively until a sufficient recognition quality is achieved. Based on the last semantic analysis, a function is then carried out.

A further approach for increasing the reliability of the speech processing uses speech processing by an external computer system, in addition to local speech processing.

For example, EP 2 909 833 B1 describes a method for speech recognition in a transportation vehicle. Voice inputs are received from a user, and at least one of them is passed to an internal vehicle onboard speech recognition system. The speech recognition system then generates a first recognition result. A processor unit also passes the voice input entirely or partially to an offboard speech recognition system which is outside the transportation vehicle and which transmits a second recognition result to the processor unit. Contextual information may be taken into consideration when performing the speech recognition. The speech text is determined by an evaluation unit as a function of the first and second recognition results.

US 2015/0058018 A1 describes a method for recognizing a voice input which comprises natural language and at least one word from a domain-specific vocabulary. In a first speech processing pass, a first segment of the voice input is identified which contains the natural language, and a second segment is identified which contains the at least one domain-specific word. In addition, in this pass, the natural language contained in the first segment is processed. In a second speech processing pass, the second segment containing the at least one domain-specific word is processed.

Manufacturers of user terminal devices, for example, smartphones, tablets, laptops, or PCs, have been using their proprietary speech processing systems for some time. Examples include APPLE® SIRI®[1], MICROSOFT® CORTANA®[2], or GOOGLE® Allo [3]. These systems become acquainted with the user behavior in a personalized manner and optimize their responses through continuous use. Enhancements, for example, of Amazon Echo [4, 5], can control smart home applications via speech. Smartphones having a speech processing system may already be partially integrated into a transportation vehicle.

For example, DE 10 2014 209 992 A1 describes a transportation vehicle interface module which can communicate with a mobile device of a user and with a transportation vehicle. For this purpose, the transportation vehicle interface module comprises a wireless transceiver for communication with the mobile device, and a transportation vehicle transceiver for communication with a transportation vehicle data bus. By way of the transportation vehicle transceiver, a processor of the transportation vehicle interface module receives a signal from the transportation vehicle data bus which was initiated via a user input into the transportation vehicle computer system. The processor ascertains whether the signal requests activating a speech recognition session on the mobile device. If this is the case, a request is made to the mobile device by the wireless transceiver to start a speech recognition session.

DE 10 2012 218 938 A1 describes a method for identifying and triggering services for a speech-based interface of a mobile device. The method includes receiving a speech recognition result which represents the content of a voice input in a mobile device. A desired service is determined by processing the speech recognition result using a service identification grammar. A user service request is determined by processing a portion of the speech recognition result using the service-specific grammar. The user service request is released and a service response is received. An audio message is generated from the service response. The audio message is presented to a user over a loudspeaker.

It is expected that there will be an enhancement of the integrated speech control in transportation vehicles in the future, in which there is increased reliance on speech processing in a back-end system. For this purpose, it is anticipated that transportation vehicle manufacturers will produce or provide proprietary back-end systems.

Current speech processing systems can be activated in different ways by the user, wherein the speech processing systems may also provide several options for activation in parallel.

A first approach consists of the user having to press a button to enable a voice input. After pressing the button, the system first gives an acoustic response, for example, as a signal tone or via a voice output. Subsequently, the user can give a voice command, which is detected and processed by the system.

Under a second approach, activation of the speech processing system takes place in that the user says a signal word which is detected and evaluated by the system. The signal word is not necessarily a single word; it may also be a word sequence. After the signal word has been successfully recognized, the system generally then gives an acoustic response. As with the first approach, a signal tone or a voice output may be used for this. As described previously, the user may subsequently give a voice command, which is detected and processed by the system. Since the speech processing system is awoken from a quiescent state by saying the signal word, the term "wake-up phase" has established itself as an alternative designation for the signal word.

According to a third approach, the user speaks the signal word, followed directly by a voice input or a voice command in a single sentence. In this case, directly after recognizing the signal word, there is no acoustic response by the system.

If the case is now considered in which, in addition to proprietary speech processing of the transportation vehicle manufacturer in a transportation vehicle, speech processing by other providers and the integration of mobile user terminal devices are also provided in addition to their speech processing, the question arises as to how the user can activate the various services. One approach is to activate the various speech processing systems via particular buttons or signal words. Pushing a button on a multifunction steering wheel then starts, for example, the speech processing of a smartphone, while the signal word "hello Volkswagen" activates the speech processing of the transportation vehicle manufacturer, in which the speech recognition is carried out in the transportation vehicle or also partially or completely in an external system. On other hand, the signal word "hello computer" activates the speech processing of the other providers.

One downside of this approach is that users must know which functionality they would like to use to decide which voice assistant to activate. In addition, users must know how the respective voice assistant is activated.

Disclosed embodiments provide improved approaches for processing a voice input.

This is achieved via a method, via a computer-readable storage medium comprising instructions, and via a device.

According to a first disclosed embodiment, a method for processing a voice input comprises:
  receiving a voice input by a user;
  preparing the voice input for at least one of two or more available speech processing services, wherein, when preparing the voice input, one or several prepared voice inputs are generated by adding a signal word to the voice input in each case; and
  passing prepared voice inputs to one or several of the available speech processing services.

According to another disclosed embodiment, a computer-readable storage medium contains instructions which, when executed by a computer, cause the computer to execute the following operations for processing a voice input:
  receiving a voice input by a user;
  preparing the voice input for at least one of two or more available speech processing services, wherein when preparing the voice input, one or several prepared voice inputs are generated by adding a signal word to the voice input in each case; and
  passing prepared voice inputs to one or several of the available speech processing services.

Here, the term "computer" is to be understood broadly. The term also comprises control units and other processor-based data processing devices.

According to another disclosed embodiment, the device for processing a voice input comprises:
    an input which is configured to receive a voice input;
    a preprocessing module which is configured to prepare the voice input for at least one of two or more available speech processing services, wherein when preparing the voice input, one or several prepared voice inputs are generated by adding a signal word to the voice input; and
    an interface which is configured to pass prepared voice inputs to one or several of the available speech processing services.

Under the disclosed approach, voice inputs of a user are initially preprocessed before they are passed to at least one of several available speech processing services. Within the scope of the preprocessing, it is ensured that the various speech processing services are correctly activated, or suitable processing services are contacted. The user can thus simply speak and does not have to think about which speech processing service to contact and how to activate this speech processing service.

According to at least one disclosed embodiment, when preparing the voice input for several or each of the two or more available speech processing services, a prepared voice input is generated by adding an associated signal word to the voice input in each case. The corresponding prepared voice input is then passed to each of the selected speech processing services. Under this approach, the original voice input for the selected speech processing services is provided with the appropriate signal word and is then transmitted to the respective speech processing services. This approach has the benefit that the preprocessing only requires very simple preprocessing which requires little computing power.

According to at least one disclosed embodiment, the disclosed method comprises the following as additional operations:
    receiving responses from the speech processing services;
    evaluating the received responses; and
    outputting at least one of the responses remaining after the evaluation.

After the prepared voice inputs have been passed to the selected speech processing services and have been processed by them, the received responses are evaluated by a response filter. The response filter passes reasonable or plausible responses to the user, i.e., responses having the highest hit probability. In this case, the intelligence lies in the scoring of the various responses of the external speech processing services by the response filter. One benefit of filtering the responses is that the user does not have to deal with nonsensical or improbable responses, whereby the acceptance of the concept by the user is increased.

According to at least one disclosed embodiment, there is a query to the user if, when evaluating the received responses, two or more responses are classified as being plausible. It may occur that several plausible responses are received. In this case, it is reasonable that the user is queried as to which response to the underlying voice input corresponds best to a response expected by the user. In this way, the system can learn using semantically similar contexts and can score future responses better.

According to at least one disclosed embodiment, when evaluating, responses are suppressed which indicate that a prepared voice input could not be successfully prepared by one of the activated speech processing services. Generally, the response of a speech processing service follows a certain rule if a voice input could not be processed. For example, the response may begin with "I don't understand . . . ." Such responses are thus quite easy to filter, so that they are not even subjected to a check with respect to their plausibility. In this way, the computing power which is required for the evaluation of the received responses can be reduced.

According to at least one disclosed embodiment, the preparation of the voice input comprises:
    analyzing the voice input with respect to its content;
    associating the voice input with one of the available speech processing services; and
    generating a prepared voice input by adding a signal word to the voice input which belongs to the associated speech processing service.

Under this approach, the voice input is processed in such a way that a semantic recognition is first carried out and, for example, the subject of the voice input is determined. Depending on the subject, the suitable speech processing service is then determined. Subsequently, the signal word required for this speech processing service is added to the voice input, and the voice input thus prepared is passed to the speech processing service. Although this approach requires preprocessing which more intelligent and thus uses more computing power, there is a benefit that the user only receives a single response in return. Thus, no further evaluation of the received response is required.

According to at least one disclosed embodiment, when analyzing the voice input, keywords recognized in the voice input are compared with a database in which an association between keywords and speech processing services is stored. By using a keyword database, an association of the voice input with a speech processing service can take place in a simple manner. For example, the keyword "purchase" may be linked to a first speech processing service, the keyword "weather" may be linked to a second speech processing service, and the keyword "warmer" may be linked to a third speech processing service, for example, a proprietary transportation vehicle speech processing system which controls the climate control system based on the voice input.

According to at least one disclosed embodiment, the user is provided with an option for correcting the association of the voice input with one of the available speech processing services. When analyzing the content of the voice inputs, incorrect decisions may be made. Thus, it is expedient if the user is able to intervene to make corrections. Based on the corrections made, the basis for decision with respect to the association may be dynamically adjusted, so that the same query is correctly associated the next time. The system is thus capable of learning.

According to at least one disclosed embodiment, when preparing the voice input, a signal word which is possibly present in the voice input and which belongs to one of the available speech processing services is first removed. It may occur that the user habitually uses a signal word which does not match the specific voice input. Nonetheless, to be able to process the voice input in a reasonable manner, it is helpful first to remove such a signal word within the scope of the preprocessing.

According to at least one disclosed embodiment, when preparing the voice input, a signal word which is present in the voice input and which belongs to one of the available speech processing services is detected. The voice input is then associated with the corresponding speech processing service. Under this approach, it is assumed that a signal word spoken by the user in the voice input is correct. On this basis, the voice input may be passed to the corresponding speech processing service without further processing.

According to at least one disclosed embodiment, when preparing the voice input, the voice input resynthesized. For example, superfluous filler words are removed, or voice inputs are reformulated in such a way that they are more reliably recognized by the respective speech processing services. Thus, the voice input "I'm cold" may, for example, be passed to a proprietary transportation vehicle speech processing system as "hello Volkswagen, please set my temperature in the vehicle higher." Of course, in this case, a voice input may be resynthesized differently for various speech processing services.

A disclosed method or a disclosed device is used in a transportation vehicle. Furthermore, a disclosed method or a disclosed device may also be used in user terminal devices, for example, in smartphones, smart home devices, PCs and laptops, etc.

To improve the understanding of the principles of the present disclosure, exemplary embodiments will be described below in greater detail, based on the figures. It is to be understood that the present disclosure is not limited to these exemplary embodiments, and that the described features may also be combined or modified without departing from the scope of protection of the present disclosure as it is defined in the appended claims.

FIG. 1 schematically depicts a method for processing a voice input. In a first operation, a voice input by a user is received 10. The voice input is subsequently prepared for at least one of two or more available speech processing services 11. Finally, prepared voice inputs are passed to one or several of the available speech processing services 12.

Figure 2:
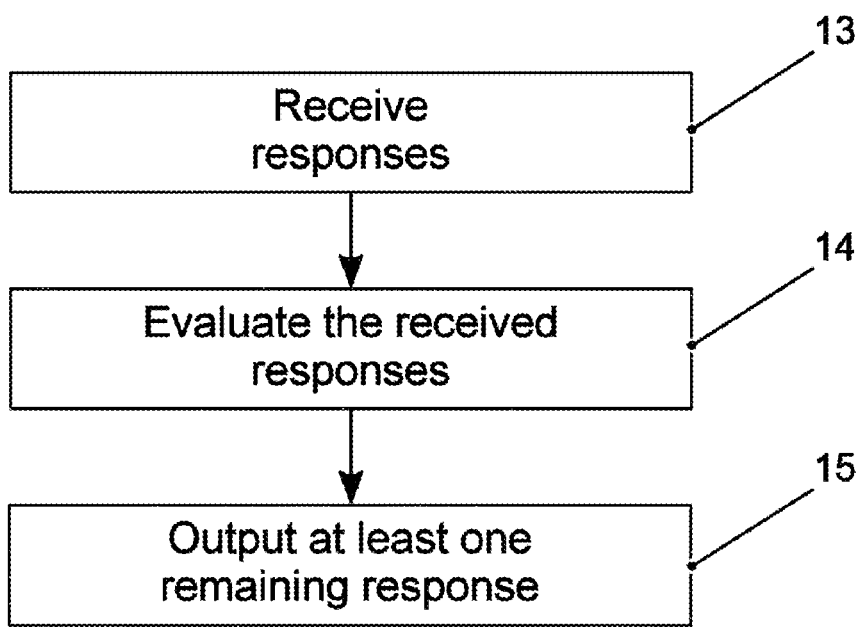
FIG. 2 schematically depicts processing of received responses.

In a first disclosed embodiment, when preparing the voice input for several or each of the two or more available speech processing services, a prepared voice input is generated by adding an associated signal word to the voice input in each case. The associated prepared voice input is then passed to each of the selected speech processing services. Subsequently, responses of the speech processing services are received 13 and evaluated 14. Finally, at least one of the remaining responses from the evaluation is output 15. This is schematically depicted in FIG. 2. When evaluating the received responses, if two or more responses are classified as plausible, the user may be queried. In addition, when evaluating, responses may be suppressed which indicate that a prepared voice input could not be successfully prepared by one of the available speech processing services.

In a further disclosed embodiment, the voice input may be analyzed with respect to its content, for example, via a comparison of keywords recognized in the voice input with a database in which an association between keywords and speech processing services is stored. Based on a result of the analysis, the voice input is associated with one of the available speech processing services. Finally, by adding a signal word to the voice input which belongs to the associated speech processing service, a prepared voice input is generated. In this case, an option for correcting the association of the voice input with one of the available speech processing services may be provided to the user.

In a third disclosed embodiment, a signal word which is present in the voice input and which belongs to one of the available speech processing services may be detected. The voice input is then associated with the corresponding speech processing service.

Optionally, the user can determine which type of preparation is used, or can influence characteristics of the preparation.

In the first twos disclosed embodiments, a signal word which is possibly present in the voice input and which belongs to one of the available speech processing services may first be removed as appropriate. In all disclosed embodiments, the voice input may be resynthesized for the transfer to the speech processing services.

Furthermore, it may be provided that the user must first activate the speech processing, for example, by pushing a button, or must explicitly confirm the transfer to a speech processing service, via suitable measures. In this way, it may be ruled out that, for example, conversations between the passengers of a transportation vehicle inadvertently trigger actions by the speech processing services.

Figure 3:
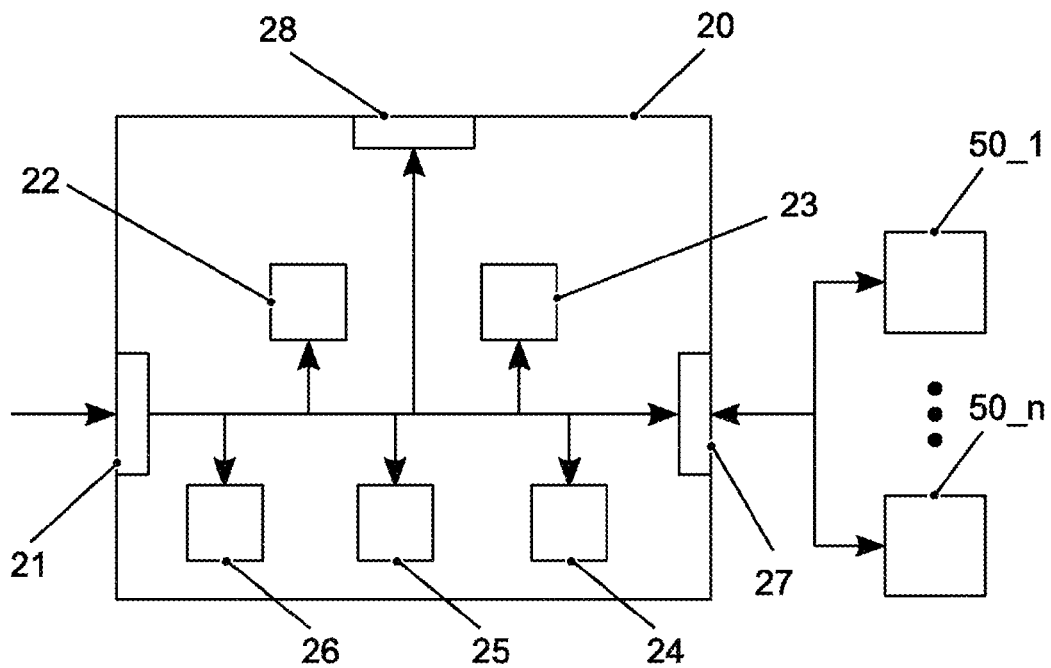
FIG. 3 depicts a first exemplary embodiment of a device for processing a voice input.

FIG. 3 depicts a simplified schematic representation of a first disclosed embodiment of a device 20 for processing a voice input. The device 20 has an input 21 via which a voice input by a user can be received, for example, from a microphone or another audio source, and a memory 26 in which the received voice input can be stored. A preprocessing module 22 prepares the voice input for at least one of two or more available speech processing services $50\_1, \ldots, 50\_n$. In this case, the preparation of the voice input may take place as described above in connection with FIG. 1. The device 20 may therefore comprise a database 24 in which an association between keywords and speech processing services $50\_1, \ldots, 50\_n$ is stored. Prepared voice inputs are passed to one or several of the available speech processing services $50\_1, \ldots, 50\_n$ via an interface 27. In addition, responses of the speech processing services $50\_1, \ldots, 50\_n$ are received via the interface 27 and can be evaluated by a response filter 23. The evaluation of the responses may take place as described above in connection with FIG. 2.

The preprocessing module 22, the response filter 23, and the database 24 may be controlled by a control unit 25. Via a user interface 28, settings of the preprocessing module 22, the response filter 23, or the control unit 25 may possibly be changed, or queries may be provided to and answered by the user. In addition, content of the database 24 may be processed via the user interface 28. The data generated in the device 20 may be stored in the memory 26 if needed, for example, for a later evaluation or for use by the components of the device 20. The preprocessing module 22, the response filter 23, and the control unit 25 may be implemented as dedicated hardware, for example, as integrated circuits. Of course, they may also be partially or fully combined or implemented as software which runs on a suitable processor, for example, on a CPU or GPU. The input 21 and the interface 27 may be implemented as separate interfaces or as a combined bidirectional interface.

Figure 4:
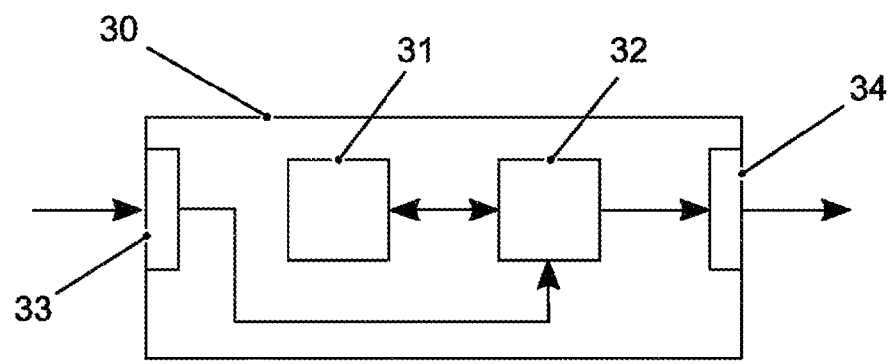
FIG. 4 depicts a second exemplary embodiment of a device for processing a voice input.

FIG. 4 depicts a simplified schematic representation of a second disclosed embodiment of a device 30 for processing a voice input. The device 30 comprises a processor 32 and a memory 31. For example, the device 30 is a computer or a control unit. Instructions are stored in the memory 31 which cause the device 30 to execute the operations according to one of the described methods during execution by the processor 32. The instructions stored in the memory 31 thus incorporate a program which is executable by the processor 32, and which implements the disclosed method. The device 30 has an input 33 for receiving audio data, for example, from a microphone or another audio source. Data generated by the processor 32 are provided via an output 34. In addition, the data may be stored in the memory 31. The input 33 and the output 34 may be combined into a bidirectional interface.

The processor 32 may comprise one or multiple processor units, for example, microprocessors, digital signal processors, or combinations thereof.

The memories 26, 31 of the described embodiment may have both volatile and nonvolatile memory areas and may comprise a variety of memory devices and storage media, for example, hard drives, optical storage media, or semiconductor memory.

Figure 5:
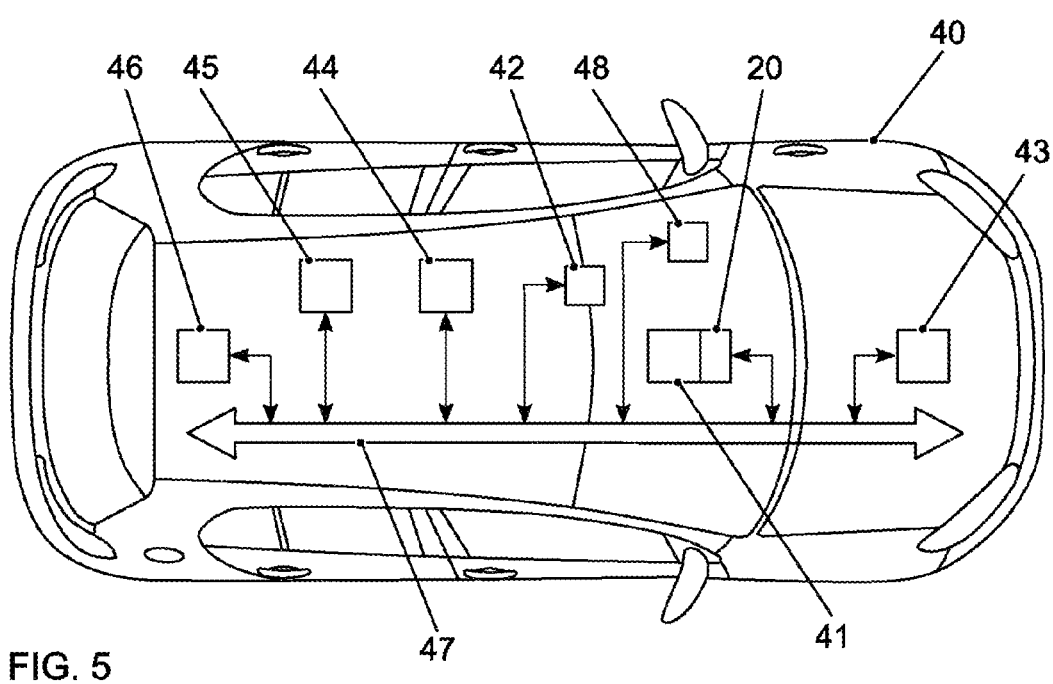
FIG. 5 schematically depicts a transportation vehicle in which an exemplary approach has been implemented.

FIG. 5 schematically depicts a transportation vehicle 40 in which a disclosed solution is implemented. The transportation vehicle 40 comprises an operating device 41, for example, an infotainment system having a touchscreen and the option of voice control. A microphone 42 is installed in the transportation vehicle 40 detecting voice inputs.

Further, the transportation vehicle 40 comprises a device 20 for processing a voice input. The device 20 may also be integrated into the operating device 41. Further components of the transportation vehicle 40 include a climate control 43 and a navigation system 44 which can be operated by the user, inter alia, via voice inputs. By way of a data transmission unit 45, a connection to a provider of an external speech processing service may be established as necessary, for example, via a mobile telephone network. A memory 46 is present for storing data. The data exchange between the various components of the transportation vehicle 40 takes place via a network 47. Responses to the voice input by the user may be output via a loudspeaker 48.

Figure 6:
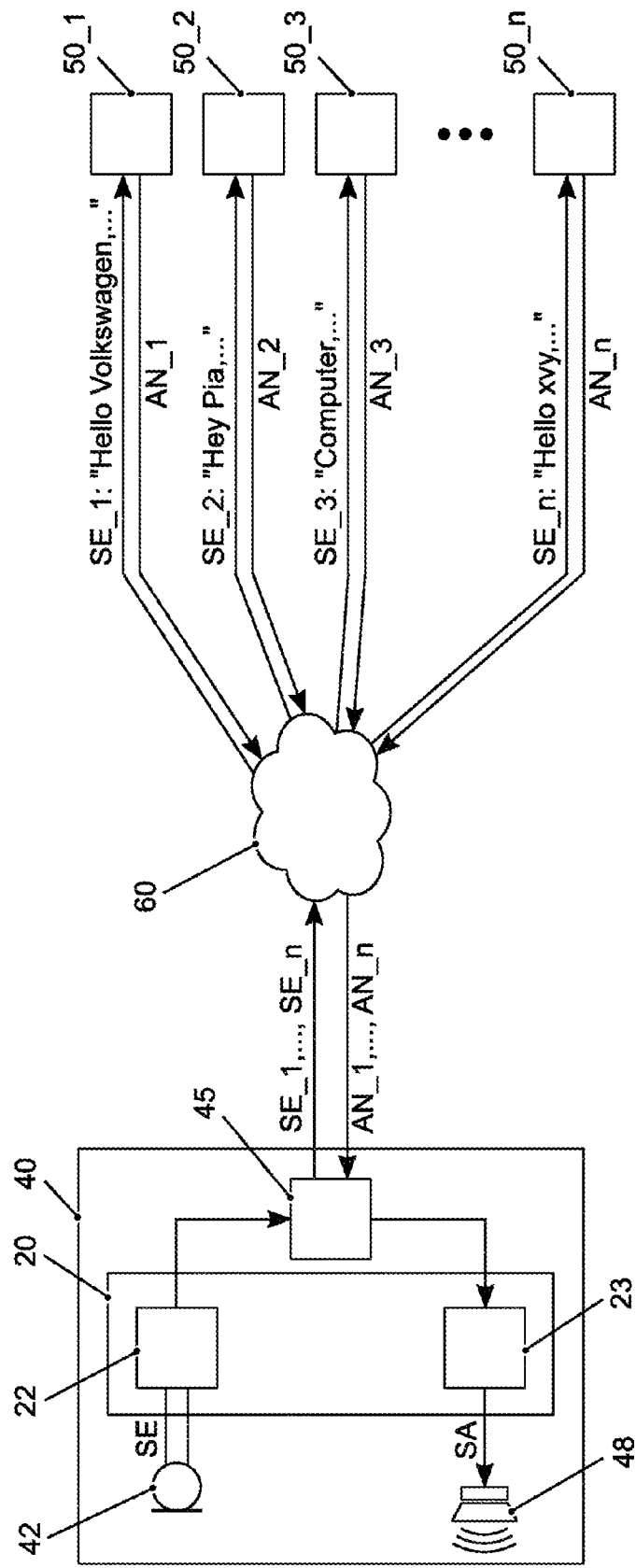
FIG. 6 schematically depicts a system design of a first exemplary embodiment of the disclosed approach for processing a voice input.
Figure 7:
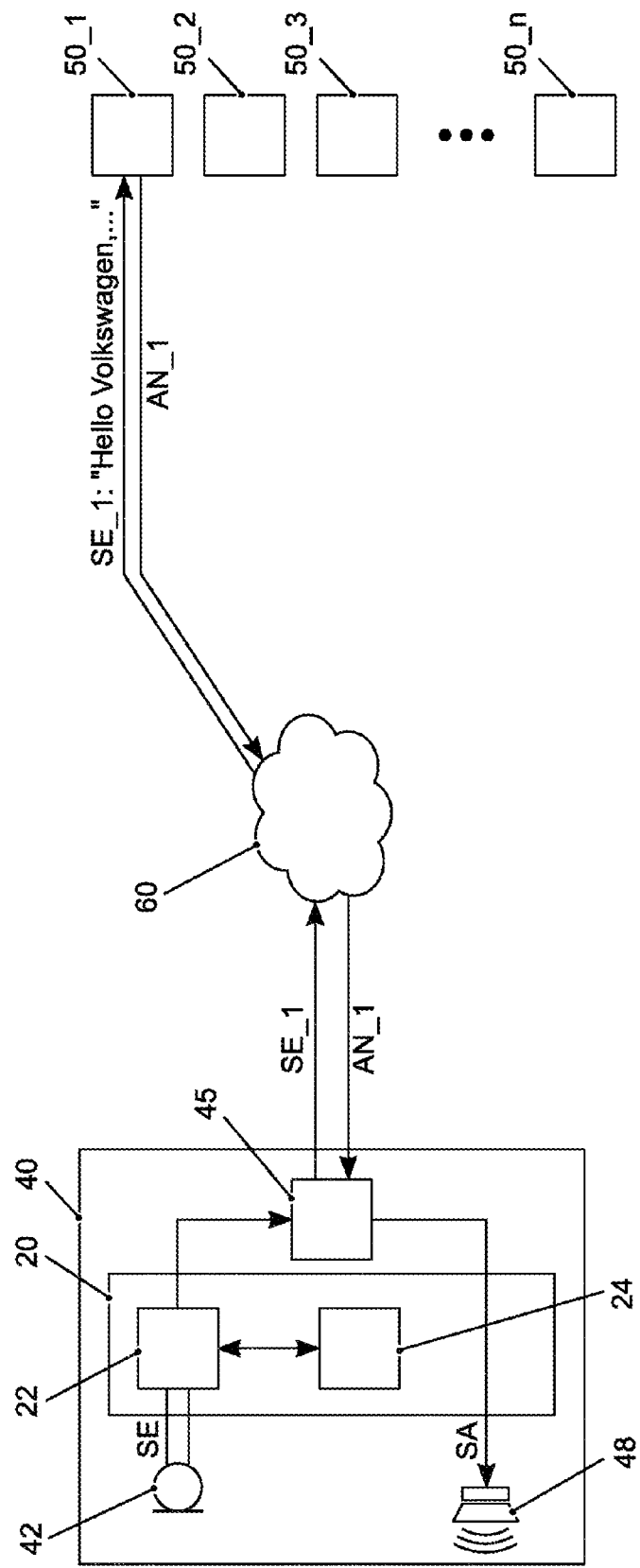
FIG. 7 schematically depicts a system design of a second exemplary embodiment of the disclosed approach for processing a voice input.

The functionality of the disclosed approach is to be described in greater detail based on FIGS. 6 to 8, using the example of use in a transportation vehicle.

FIG. 6 schematically depicts a system design of a first exemplary embodiment of the disclosed approach for processing a voice input SE. A device 20 for processing a voice input detects a voice input SE provided by a user, with the aid of a microphone 42 which is installed in the transportation vehicle 40. A preprocessing module 22 of the device 20 prepares the voice input SE for a variety of speech processing services $50\_1, \ldots, 50\_n$. The voice input SE may be resynthesized as necessary. In the example, the speech processing services $50\_1, \ldots, 50\_n$ are specifically a service $50\_1$ of the manufacturer of the transportation vehicle 40, a smart home solution $50\_2$, and a shopping application $50\_3$. As a last speech processing service $50\_n$, a generic service is depicted. The service $50\_1$ of the manufacturer responds to the signal word "hello Volkswagen," the smart home solution $50\_2$ acting as a personal intelligent assistant responds to the signal word "hey Pia," the shopping application $50\_3$ responds to the signal word "computer," and the generic service $50\_n$ responds to the signal word "hello xyz." The resulting prepared voice inputs $SE\_1, \ldots, SE\_n$ are transmitted to the desired speech processing services $50\_1, \ldots, 50\_n$ via a data network 60 with the aid of a data transmission unit 45 of the transportation vehicle 40. Responses $AN\_1, \ldots, AN\_n$ of the speech processing services $50\_1, \ldots, 50\_n$ are received via the data network 60 and the data transmission unit 45, and are passed to a response filter 23 of the device 20. The filter evaluates the received responses $AN\_1, \ldots, AN\_n$, and outputs at least one of the responses remaining after the evaluation to the user as a speech output SA, via a loudspeaker 48 of the transportation vehicle 40. Optionally, only reasonable responses of the speech processing services $50\_1, \ldots, 50\_n$ are passed by the response filter 23.

For example, the response "I didn't understand you" by the smart home solution $50\_2$ and the shopping application $50\_3$ as a result to the original voice input "I'm cold" is blocked by the response filter 23. However, the response "I've set the temperature in the transportation vehicle two degrees higher" by the service $50\_1$ manufacturer of the transportation vehicle 40 is passed by the response filter 23.

FIG. 7 schematically depicts a system design of a second exemplary embodiment of the disclosed approach for processing a voice input SE. The system design corresponds largely to the system design from FIG. 6; however, another approach was implemented for preparing the voice input SE. The preprocessing module 22 analyzes the voice input SE with respect to its content. For this purpose, the preprocessing module 22 or an additional module provided for this purpose compares keywords recognized in the voice input SE with a database 24 in which an association between keywords and speech processing services $50\_1, \ldots, 50\_n$ is stored. Based on the result of the analysis, the voice input SE is associated with one of the speech processing services $50\_1, \ldots, 50\_n$, in this example, the service $50\_1$ of the manufacturer of the transportation vehicle 40. Finally, by adding the corresponding signal word to the voice input SE, a prepared voice input $SE\_1$ is generated. In addition, the voice input SE may be resynthesized. As usual, the prepared voice input $SE\_1$ is transmitted with the aid of the data transmission unit, via the data network 60, to the associated speech processing service $50\_1$. Finally, the response $AN\_1$ of the speech processing service $50\_1$ is received via the data network 60 and the data transmission unit 45, and is output to the user as a speech output SA via the loudspeaker 48. For example, the original voice input "I'm cold" may be passed to the service $50\_1$ of the manufacturer of the transportation vehicle 40 as "hello Volkswagen, please set the temperature in the vehicle higher." The user subsequently receives the response "I've set the temperature in the vehicle two degrees higher." The original voice input "Turn on the heating system at home" is correspondingly passed to the smart home solution $50\_2$ as "hey Pia, turn on the heating system at home." The user subsequently receives, for example, the response "I've turned on the heating system."

FIG. 8 depicts several examples of voice inputs SE by the user and associated prepared voice inputs.

Figure 8A:
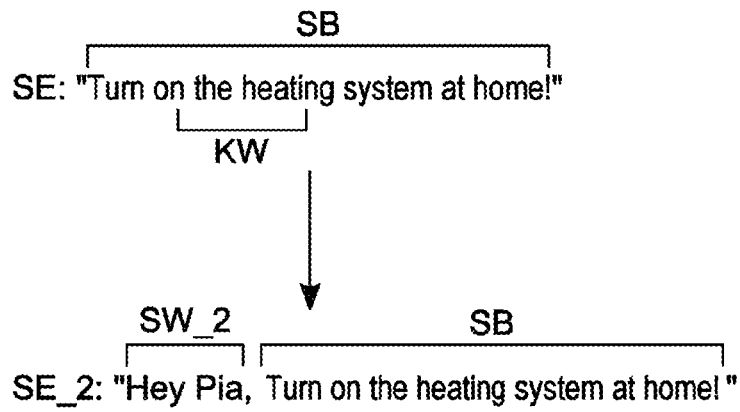
FIGS. 8A-C depicts several examples of voice inputs by the user and associated prepared voice inputs.

In FIG. 8A, the voice input SE comprises only a speech command SB, in this case, the request "Turn on the heating system at home." From the keyword KW "at home," it can be deduced that the voice input is directed to the smart home solution used by the user. Since this signal word $SW\_2$ uses "hey Pia," this signal word $SW\_2$ is added to the voice input SE before passing it to the smart home solution. The prepared voice input $SE\_2$ is thus "hey Pia, turn on the heating system at home."

Figure 8B:
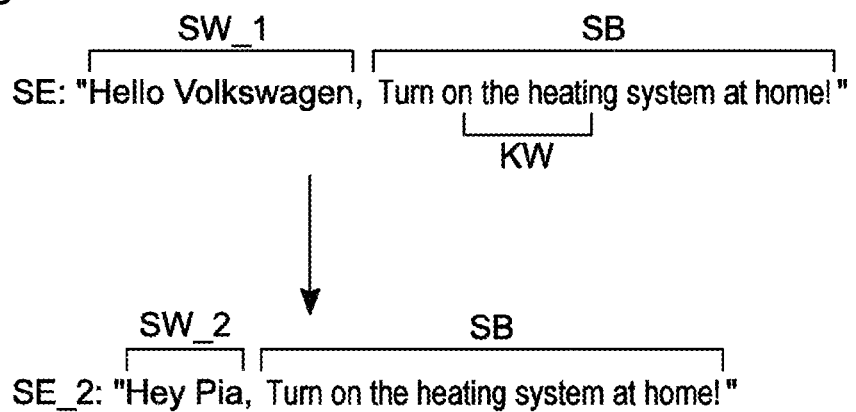

In FIG. 8B, in addition to the known speech command SB "turn on the heating system at home," the voice input SE comprises a signal word $SW\_1$ having the formulation "hello Volkswagen," which belongs to a speech processing service which matches the content of the speech command SB. Within the scope of the preparation, this signal word $SW\_1$ is removed and replaced by the matching signal word $SW\_2$ "hey Pia," so that the prepared voice input $SE\_2$ is "hey Pia, turn on the heating system at home."

Figure 8C:
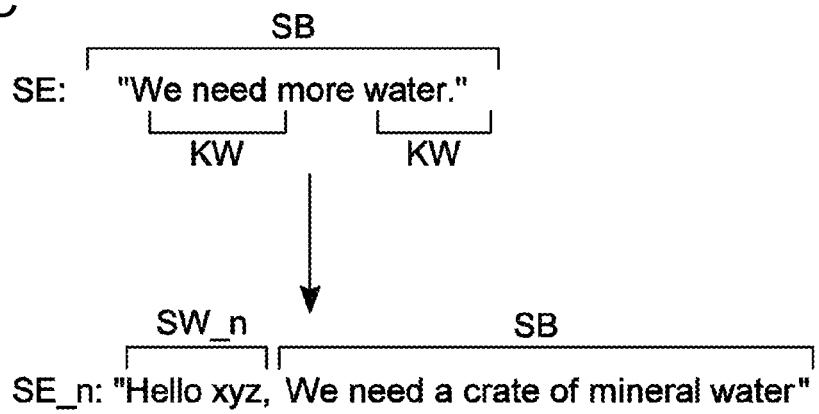

In FIG. 8C, the voice input SE comprises only the speech command SB "we need more water." It may be inferred from the keywords KW "need" and "water" that the user would like to make note of an item for shopping; thus, the user uses an application which uses the signal word $SW\_n$ "hello xyz." In addition, it is known from the previous responses by the user that, by "water," the user means a crate of mineral water. Therefore, the voice input $SE\_n$ generated prepared by the system is "hello xyz, we need a crate of mineral water".

REFERENCES

[1] de.wikipedia.org/wiki/Siri_(Software)
[2] de.wikipedia.org/wiki/Cortana_(Software)

[3] de.wikipedia.org/wiki/Google_Allo
[4] de.wikipedia.org/wiki/Amazon_Echo
[5] reverb.ai/

LIST OF REFERENCE CHARACTERS

10 Receive a voice input
11 Prepare the voice input
12 Pass the prepared voice inputs
13 Receive responses
14 Evaluate the received responses
15 Output at least one remaining response
20 Device
21 Input
22 Preprocessing module
23 Response filter
24 Database
25 Control unit
26 Memory
27 Interface
28 User interface
30 Device
31 Memory
32 Processor
33 Input
34 Output
40 Transportation vehicle
41 Operator control device
42 Microphone
43 Climate control
44 Navigation system
45 Data transmission unit
46 Memory
47 Network
48 Loudspeaker
50_1, . . . , 50_n Speech processing service
60 Data network
AN_1, . . . , AN_n Response
KW Keyword
SA Speech output
SB Speech command
SE Voice input
SE_n Prepared voice input
SW_1, . . . , SW_n Signal word

The invention claimed is:

1. A method for processing a voice input, the method comprising:
receiving a voice input of a user;
preparing the received voice input for at least one of two or more available speech processing services, wherein, when preparing the received voice input, one or more prepared voice inputs are generated by a pre-processing module by adding a signal word to the received voice input; and
passing the one or more prepared voice inputs to one or several of the available speech processing services,
wherein the signal word is associated with one of the available speech processing services.

2. The method as claimed in of claim 1, wherein the preparing of the received voice input for several or each of the two or more available speech processing services, includes generating a prepared voice input by adding an associated signal word to the received voice input in each case, wherein the associated prepared voice input is passed to each selected speech processing service.

3. The method of claim 2, further comprising:
receiving responses of the speech processing services;
evaluating the received responses; and
outputting at least one of the responses remaining after the evaluation.

4. The method of claim 3, wherein a query to the user takes place in response to two or more responses being classified as plausible when evaluating the received response.

5. The method of claim 3, wherein, when evaluating, responses are suppressed which indicate that a prepared voice input was not successfully prepared by one of the available speech processing services.

6. The method of claim 1, wherein the preparation of the voice input comprises:
analyzing the received voice input with respect to its content;
associating the received voice input with one of the available speech processing services; and
generating a prepared voice input by adding the signal word to the voice input which belongs to the associated speech processing service.

7. The method of claim 6, wherein, when analyzing the received voice input, keywords recognized in the voice input are compared with a database in which an association between keywords and speech processing services is stored.

8. The method of claim 6, wherein the user is provided with an option for correcting the association of the voice input with one of the available speech processing services.

9. The method of claim 1, wherein, when preparing the received voice input, a signal word which is present in the voice input and which belongs to one of the available speech processing services is removed.

10. The method of claim 1, wherein, when preparing the received voice input, a signal word which is present in the voice input and which belongs to one of the available speech processing services is detected, and the received voice input is associated with the corresponding speech processing service.

11. The method of claim 1, wherein the received voice input is resynthesized when preparing the voice input.

12. A device for processing a voice input, the device comprising:
an input to receive a voice input;
a preprocessing module to prepare the voice input for at least one of two or more available speech processing services, wherein one or more voice inputs are generated by the preprocessing module by adding a signal word to the voice input when preparing the voice input; and
an interface to pass voice inputs to available speech processing services,
wherein the signal word is associated with one of the available speech processing services.

13. A non-transitory computer-readable storage medium comprising instructions which, when executed by a computer, cause the computer to process a voice input by implementing the functionality of the preprocessing module and the interface as recited in claim 12.

14. A transportation vehicle with speech processing, wherein the transportation vehicle comprises the device of claim 12.

15. A user terminal device with speech processing, wherein the user terminal device comprises the device of claim 12.

16. The device of claim 12, wherein the preparing of the voice input for several or each of the two or more available speech processing services includes generating a prepared voice input by adding an associated signal word to the voice input in each case, wherein the associated prepared voice input is passed to each of the selected speech processing services.

17. The device of claim 16, wherein responses of the speech processing services are received and evaluated and at least one of the responses remaining after the evaluation is output.

18. The device of claim 17, wherein a query to the user takes place in response to two or more responses being classified as plausible when evaluating the received response.

19. The device of claim 17, wherein, when evaluating, responses are suppressed which indicate that a prepared voice input was not successfully prepared by one of the available speech processing services.

20. The device of claim 12, wherein the preparation of the voice input includes analysis of the voice input with respect to its content, association of the voice input with one of the available speech processing services, and generation of a prepared voice input by adding a signal word to the voice input which belongs to the associated speech processing service.

21. The device of claim 20, wherein, when analyzing the voice input, keywords recognized in the voice input are compared with a database in which an association between keywords and speech processing services is stored.

22. The device of claim 20, wherein the user is provided with an option for correcting the association of the voice input with one of the available speech processing services.

23. The device of claim 12, wherein, when preparing the voice input, a signal word which is present in the voice input and which belongs to one of the available speech processing services is removed.

24. The device of claim 12, wherein, when preparing the voice input, a signal word which is present in the voice input and which belongs to one of the available speech processing services is detected, and the voice input is associated with the corresponding speech processing service.

25. The device of claim 12, wherein the voice input is resynthesized when preparing the voice input.

* * * * *